United States Patent
Perego et al.

(10) Patent No.: US 10,811,163 B2
(45) Date of Patent: Oct. 20, 2020

(54) ENERGY CABLE

(75) Inventors: Gabriele Perego, Milan (IT); Sergio Belli, Milan (IT)

(73) Assignee: PRYSMIAN S.p.A., Milan (IT)

( * ) Notice: Subject to any disclaimer, the term of this patent is extended or adjusted under 35 U.S.C. 154(b) by 2473 days.

(21) Appl. No.: 13/575,774

(22) PCT Filed: Jan. 29, 2010

(86) PCT No.: PCT/IB2010/000155
§ 371 (c)(1),
(2), (4) Date: Oct. 15, 2012

(87) PCT Pub. No.: WO2011/092533
PCT Pub. Date: Aug. 4, 2011

(65) Prior Publication Data
US 2013/0025909 A1    Jan. 31, 2013

(51) Int. Cl.
*H01B 3/30* (2006.01)
*H01B 3/22* (2006.01)
(Continued)

(52) U.S. Cl.
CPC ............ *H01B 3/22* (2013.01); *H01B 3/441* (2013.01); *C08K 3/013* (2018.01); *C08K 5/01* (2013.01); *C08K 7/00* (2013.01)

(58) Field of Classification Search
CPC ............ C08L 23/12; C08L 23/14; H01B 3/30
See application file for complete search history.

(56) References Cited

U.S. PATENT DOCUMENTS 6,365,689 B1 * 4/2002 Ushioda et al. ............... 526/160
6,495,760 B1 * 12/2002 Castellani ............... H01B 3/441
174/110 R
(Continued)

FOREIGN PATENT DOCUMENTS

| EP | 2 072 575 A1 | 6/2009 |
| GB | 1328102 | 8/1973 |

(Continued)

OTHER PUBLICATIONS

Montanari et al.; "Modification of Electrical Properties and Performance of Eva and PP Insulation Through Nanostructure by Organophilic Silicates", IEEE Transactions on Dielectrics and Electrical Insulation, vol. 11, No. 5, pp. 754-762, (2004).

(Continued)

*Primary Examiner* — Jennifer A Chriss
(74) *Attorney, Agent, or Firm* — Finnegan, Henderson, Farabow, Garrett & Dunner, L.L.P.

(57) ABSTRACT

A cable includes at least one electrical conductor and at least one electrically insulating layer surrounding the electrical conductor, wherein the at least one electrically insulating layer includes: (a) a thermoplastic polymer material selected from: at least one copolymer (i) of propylene with at least one olefin comonomer selected from ethylene and an V-olefin other than propylene, the copolymer having a melting point greater than or equal to 130° C. and a melting enthalpy of from 20 J/g to 90 J/g; a blend of at least one copolymer (i) with at least one copolymer (ii) of ethylene with at least one V-olefin, the copolymer (ii) having a melting enthalpy of from 0 J/g to 70 J/g; a blend of at least one propylene homopolymer with at least one copolymer (i) or copolymer (ii); a blend of at least one propylene homopolymer with at least one copolymer (i) or copolymer (ii); (b) at least one nano-sized filler; wherein at least one of copolymer (i) and copolymer (ii) is a heterophasic copolymer.

27 Claims, 1 Drawing Sheet

(51) Int. Cl.
*H01B 3/44* (2006.01)
*C08K 5/01* (2006.01)
*C08K 7/00* (2006.01)
*C08K 3/013* (2018.01)

(56) References Cited

U.S. PATENT DOCUMENTS

| | | | |
|---|---|---|---|
| 6,515,231 B1* | 2/2003 | Strøbech et al. | 174/137 B |
| 7,196,270 B2 | 3/2007 | Perego et al. | |
| 2003/0138628 A1* | 7/2003 | Castellani | H01B 3/22 428/375 |
| 2004/0079547 A1 | 4/2004 | Rodway et al. | |
| 2005/0228101 A1* | 10/2005 | McMahon | C08K 9/00 524/442 |
| 2008/0116424 A1* | 5/2008 | Bandyopadhyay | C08K 3/08 252/513 |
| 2010/0126756 A1 | 5/2010 | Perego et al. | |
| 2010/0267900 A1* | 10/2010 | Gahleitner et al. | 525/209 |

FOREIGN PATENT DOCUMENTS

| | | |
|---|---|---|
| RU | 2323494 | 4/2008 |
| RU | 2377677 | 12/2009 |
| SE | 0901493 L | 1/2010 |
| SU | 415883 | 2/1974 |
| WO | WO 98/52197 | 11/1998 |
| WO | WO 02/03398 A1 | 1/2002 |
| WO | WO 02/27731 A1 | 4/2002 |
| WO | WO 02/47092 A1 | 6/2002 |
| WO | WO 2004/066317 A1 | 8/2004 |
| WO | WO 2004/066318 A1 | 8/2004 |
| WO | WO 2007/048422 | 5/2007 |
| WO | WO 2007/048422 A1 | 5/2007 |
| WO | WO 2008/058572 A1 | 5/2008 |
| WO | WO 2009080208 A1 * | 7/2009 |

OTHER PUBLICATIONS

Reichert et al.; "Poly(Propylene) Organoclay Nanocomposite Formation: Influence of Compatibilizer Functionality and Organoclay Modification", Macromol. Mater. Eng., vol. 275, pp. 8-17, (2000).
Faremo et al.; "The EFI Test Method for Accelerated Growth of Water Trees", IEEE International Symposium on Electrical Insulation, pp. 191-194, (1990).
Decision to Grant a Patent for Invention from the Federal Service for Intellectual Property, Patents and Trade Marks, in counterpart Russian Application No. 2012135514/05(057153) (dated Nov. 5, 2014).
International Search Report from the European Patent Office for International Application No. PCT/IB2010/000155, dated Feb. 15, 2011.
Written Opinion of the International Searching Authority from the European Patent Office for International Application No. PCT/IB2010/000155, dated Feb. 15, 2011.

* cited by examiner

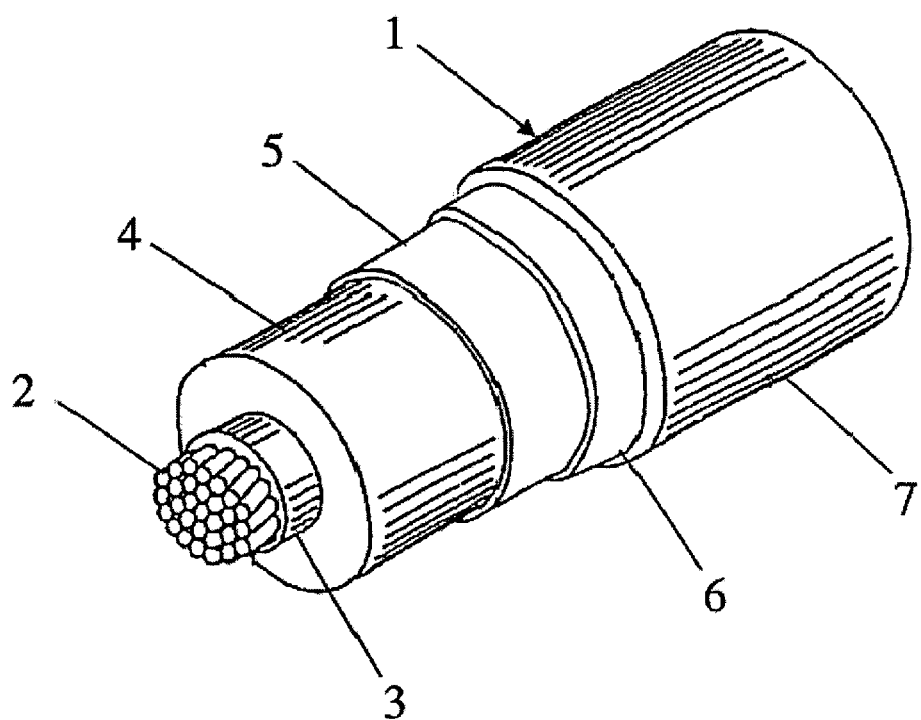

ENERGY CABLE

CROSS REFERENCE TO RELATED APPLICATION

This application is a national phase application based on PCT/IB2010/000155, filed Jan. 29, 2010.

BACKGROUND OF THE INVENTION

The present invention relates to an energy cable. In particular, the present invention relates to a cable for transporting or distributing electric energy, especially medium or high voltage electric energy, said cable having at least one polypropylene nanocomposite layer. Said cable may be used for either direct current (DC) or alternating current (AC) transmission or distribution.

Cables for transporting electric energy generally include at least one cable core. The cable core is usually formed by at least one conductor sequentially covered by an inner polymeric layer having semiconductive properties, an intermediate polymeric layer having electrically insulating properties, an outer polymeric layer having semiconductive properties. Cables for transporting medium or high voltage electric energy generally include at least one cable core surrounded by at least one screen layer, typically made of metal or of metal and polymeric material. The screen layer can be made in form of wires (braids), of a tape helically wound around the cable core or a sheet longitudinally surrounding the cable core. The polymeric layers surrounding the at least one conductor are commonly made from a polyolefin-based crosslinked polymer, in particular crosslinked polyethylene (XLPE), or elastomeric ethylene/propylene (EPR) or ethylene/propylene/diene (EPDM) copolymers, also crosslinked, as disclosed, e.g., in WO 98/52197. The crosslinking step, carried out after extruding the polymeric material onto the conductor, gives the material satisfactory mechanical and electrical properties even under high temperatures both during continuous use and with current overload.

To address requirements for materials which should not be harmful to the environment both during production and during use, and which should be recyclable at the end of the cable life, energy cables have been recently developed having a cable core made from thermoplastic materials, i.e. polymeric materials which are not crosslinked and thus can be recycled at the end of the cable life.

In this respect, electrical cables comprising at least one coating layer, for example the insulation layer, based on a polypropylene matrix intimately admixed with a dielectric fluid are known and disclosed in WO 02/03398, WO 02/27731, WO 04/066318, WO 07/048422, and WO 08/058572. The polypropylene matrix useful for this kind of cables comprises polypropylene homopolymer or copolymer or both, characterized by a relatively low cristallinity such to provide the cable with the suitable flexibility, but not to impair the mechanical properties and thermopressure resistance at the cable operative and overload temperatures. Performance of the cable coating, especially of the cable insulating layer, is also affected by the presence of the dielectric fluid intimately admixed with said polypropylene matrix. The dielectric fluid should not affect the mentioned mechanical properties and thermopressure resistance and should be such to be intimately and homogeneously admixed with the polymeric matrix.

Improvement of electrical performance of polymeric materials added with inorganic nanofillers has been suggested. For example, Montanari et al., *IEEE Transactions on Dielectrics and Electrical Insulation*, Vol. 11, No. 5, October 2004 disclose electrical properties of nanocomposite insulating materials. In particular, investigation about isotactic polypropylene (iPP) added with a nanofiller consisting of an organophilic layered silicate, specifically synthetic fluorohectorite, modified by means of exchange of interlayer sodium cations for protonated octadecylamine (ODA), $NH_3^+$, is reported. Polypropylene required the addition of a compatibilizer (20%) consisting of iPP+3.5% maleic anhydride, grafted to the backbone of the iPP chain.

Reichert et al., *Macromol. Mater. Eng.* 275, 8-17 (2000) report that, although anisotropic nanofillers were found to afford attractive combinations of stiffness and toughness when compounded with polypropylene, limited commercial availability and dispersion problems due to strong interparticle interactions of nanofillers have restricted their application. Nanocomposites were prepared by melt compounding polypropylene in the presence of fluoromica rendered organophilic by means of ion exchange with protonated amines, in the presence of maleic anhydride-grafted polypropylene (PP-g-MA).

SUMMARY OF THE INVENTION

The Applicant has faced the problem of improving the performance of energy cables having, as electrically insulating layer, a thermoplastic coating based on polypropylene. A cable coating layer, especially an insulating layer, has to fulfill a number of requirements including safe electrical performance, without breakdown even at high operating temperature like 90° C. up to 110° C. for continuous use, and up to 130° C. in case of current overload, while having acceptable mechanical properties.

In order to improve said electric properties, the use of fillers, in particular inorganic nanofillers, was considered. However, the use of nanofillers in polypropylene compositions causes a reduction of the mechanical and insulating properties of the polymeric material, because of homogeneity impairment, unless compatibilizers are used.

Use of compatibilizers means a modification of the polymeric base, such as by adding polyolefins grafted with maleic anhydride, and/or a surface treatment of the nanofiller, e.g. by applying surface-treating agents, such as silanes or fatty acids or derivatives thereof, typically used as coupling agents between the mineral filler and the polymeric material.

Compatibilizers used to improve the homogeneity of polymeric/inorganic filler mixtures typically have polar groups. The need of a compatibilizer between polypropylene and nanofiller is believed to be due to the lack of cohesion between polypropylene and nanofiller having as a consequence the impairment of the insulating properties due to an increase of the probability of formation of, for example, microvoids or discontinuous interfaces.

However, electrical properties, particularly in terms of dielectric rigidity (dielectric breakdown strength) and space charge accumulation, could be negatively affected by the addition of polar groups to the insulating material.

The Applicant has found that the above problems can be solved by providing the energy cable with at least one electrically insulating layer comprising a thermoplastic composition comprising at least one heterophasic propylene copolymer intimately admixed with a nanofiller. The use of a thermoplastic composition as defined hereinafter allows to employ a nanofiller without adding any compatibilizer even when the nanofiller is untreaded, i.e. free from surface-treating agents.

In a first aspect the present invention relates to a cable comprising at least one electrical conductor and at least one electrically insulating layer surrounding said electrical conductor, wherein the at least one electrically insulating layer comprises:

(a) a thermoplastic polymer material selected from:
at least one copolymer (i) of propylene with at least one olefin comonomer selected from ethylene and an α-olefin other than propylene, said copolymer having a melting point greater than or equal to 130° C. and a melting enthalpy of from 20 J/g to 90 J/g;
a blend of at least one copolymer (i) with at least one copolymer (ii) of ethylene with at least one α-olefin, said copolymer (ii) having a melting enthalpy of from 0 J/g to 70 J/g;
a blend of at least one propylene homopolymer with at least one copolymer (i) or copolymer (ii);
(b) at least one nano-sized filler,
wherein at least one of copolymer (i) and copolymer (ii) is a heterophasic copolymer.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and in the subsequent claims, as "conductor" it is meant an electrically conducting element usually made from a metallic material, more preferably aluminum, copper or alloys thereof, either as a rod or as a stranded multi-wire, or a conducting element as above coated with a semiconductive layer.

For the purposes of the invention the term "medium voltage" generally means a voltage of between 1 kV and 35 kV, whereas "high voltage" means voltages higher than 35 kV.

As "electrically insulating layer" it is meant a covering layer made of a material having insulating properties, namely a having a dielectric rigidity (dielectric breakdown strength) of at least 5 kV/mm, preferably greater than 10 kV/mm.

As "semiconductive layer" it is meant a covering layer made of a material having semiconductive properties, such as a polymeric matrix added with, e.g., carbon black such as to obtain a volumetric resistivity value, at room temperature, of less than 500 Ω·m, preferably less than 20 Ω·m. Typically, the amount of carbon black can range between 1 and 50% by weight, preferably between 3 and 30% by weight, relative to the weight of the polymer.

The melting enthalpy ($\Delta H_m$) can be determined by Differential Scanning calorimetry (DSC) analysis.

With "heterophasic copolymer" it is meant a copolymer in which elastomeric domains, e.g. of ethylene-propylene elastomer (EPR), are dispersed in a propylene homopolymer or copolymer matrix.

Preferably, the at least one nano-sized filler (b) is untreated. With "untreated" it is meant that the nano-sized filler is used without previous surface treatment, typically with a silane or fatty acid or derivatives thereof.

The electrically insulating layer according to the present invention is substantially devoid of any compatibilizer. With "compatibilizer" it is meant any product able to improve compatibility of the nano-filler with the polymer matrix, such as maleic anhydride or unsaturated silanes in the presence of peroxide.

Preferably, the thermoplastic polymer material (a) has a melt flow index (MFI), measured at 230° C. with a load of 21.6 N according to ASTM Standard D1238-00, of from 0.05 dg/min to 10.0 dg/min, more preferably from 0.4 dg/min to 5.0 dg/min.

The olefin comonomer in copolymer (i) can be ethylene or an α-olefin of formula $CH_2=CH-R$, where R is a linear or branched $C_2$-$C_{10}$ alkyl, selected, for example, from: 1-butene, 1-pentene, 4-methyl-1-pentene, 1-hexene, 1-octene, 1-decene, 1-dodecene, or mixtures thereof. Propylene/ethylene copolymers are particularly preferred.

The olefin comonomer in copolymer (i) is preferably present in an amount equal to or lower than 15 mol %, more preferably equal to or lower than 10 mol %.

The olefin comonomer in copolymer (ii) can be an olefin of formula $CH_2=CHR$, wherein R represents a linear or branched alkyl group containing from 1 to 12 carbon atoms. Preferably, said olefin is selected from propylene, 1-butene, isobutylene, 1-pentene, 4-methyl-1-pentene, 1-hexene, 1-octene, 1-dodecene, or mixtures thereof. Propylene, 1-hexene and 1-octene are particularly preferred.

According to a preferred embodiment, copolymer (i) or copolymer (ii) is a random copolymer.

With "random copolymer" it is meant a copolymer in which the comonomers are randomly distributed along the polymer chain.

Advantageously, in copolymer (i) or copolymer (ii) or both, when heterophasic, an elastomeric phase is present in an amount equal to or greater than 45 wt % with respect to the total weight of the copolymer.

Particularly preferred heterophasic copolymers (i) or (ii) are those wherein the elastomeric phase consists of an elastomeric copolymer of ethylene and propylene comprising from 15 wt % to 50 wt % of ethylene and from 50 wt % to 85 wt % of propylene with respect to the weight of the elastomeric phase.

Preferred copolymers (ii) are heterophasic propylene copolymers, in particular:

(ii-a) copolymers having the following monomer composition: 35 mol %-90 mol % of ethylene; 10 mol %-65 mol % of an aliphatic α-olefin, preferably propylene; 0 mol %-10 mol % of a polyene, preferably a diene, more preferably, 1,4-hexadiene or 5-ethylene-2-norbornene (EPR and EPDM rubbers belong to this class);

(ii-b) copolymers having the following monomer composition: 75 mol %-97 mol %, preferably 90 mol %-95 mol %, of ethylene; 3 mol %-25 mol %, preferably 5 mol %-10 mol %, of an aliphatic α-olefin; 0 mol %-5 mol %, preferably 0 mol %-2 mol %, of a polyene, preferably a diene (for example ethylene/1-octene copolymers).

Heterophasic copolymers can be obtained by sequential copolymerization of 1) propylene, possibly containing minor quantities of at least one olefin comonomer selected from ethylene and an α-olefin other than propylene; and then of: 2) a mixture of ethylene with an α-olefin, in particular propylene, optionally with minor portions of a polyene.

The term "polyene" generally means a conjugated or non-conjugated diene, triene or tetraene. When a diene comonomer is present, this comonomer generally contains from 4 to 20 carbon atoms and is preferably selected from: linear conjugated or non-conjugated diolefins such as, for example, 1,3-butadiene, 1,4-hexadiene, 1,6-octadiene, and the like; monocyclic or polycyclic dienes such as, for example, 1,4-cyclohexadiene, 5-ethylidene-2-norbornene, 5-methylene-2-norbornene, vinylnorbornene, or mixtures thereof. When a triene or tetraene comonomer is present, this comonomer generally contains from 9 to 30 carbon atoms and is preferably selected from trienes or tetraenes containing a vinyl group in the molecule or a 5-norbornen-2-yl group in the molecule. Specific examples of triene or tetraene comonomers which may be used in the present invention are: 6,10-dimethyl-1,5,9-undecatriene, 5,9-dimethyl-1,4,8-decatriene, 6,9-dimethyl-1,5,8-decatriene, 6,8,9-trimethyl-1,6,8-decatriene, 6,10,14-trimethyl-1,5,9,13-pentadecatetraene, or mixtures thereof. Preferably, the polyene is a diene.

Preferably, copolymer (i), copolymer (ii) or both have a melting point of from 140° C. to 180° C.

Preferably, copolymer (i) has a melting enthalpy of from 25 J/g to 80 J/g.

Preferably, copolymer (ii) has a melting enthalpy of from 10 J/g to 30 J/g.

Advantageously, when the thermoplastic material of the insulating layer comprises a blend of copolymer (i) and copolymer (ii) the latter has a melting enthalpy lower than that of the first.

Advantageously, when the thermoplastic material of the insulating layer comprises a blend of copolymer (i) and copolymer (ii), the ratio between copolymer (i) and copolymer (ii) is of from 1:9 to 8:2, preferably of from 2:8 to 7:3.

Advantageously, when the thermoplastic material of the insulating layer comprises a blend of a propylene homopolymer and at least one of copolymer (i) and copolymer (ii), the ratio between the propylene homopolymer and copolymer (i) or copolymer (ii) or both is of from 0.5:9.5 to 5:5, preferably from 1:9 to 3:7.

In a preferred embodiment of the invention, the at least one electrically insulating layer of the cable further comprises at least one dielectric fluid (c), intimately admixed with the thermoplastic material.

High compatibility between the dielectric fluid and the polymer base material is necessary to obtain a microscopically homogeneous dispersion of the dielectric fluid in the polymer base material. The dielectric fluid suitable for forming the cable covering layer of the present invention should comprise no polar compounds or only a limited quantity thereof, in order to avoid a significant increase of the dielectric losses.

The presence of a dielectric fluid in the cable of the present invention can substantially improve the electric properties thereof.

Preferably, the concentration by weight of said at least one dielectric fluid in said thermoplastic polymer material is lower than the saturation concentration of said dielectric fluid in said thermoplastic polymer material. The saturation concentration of the dielectric fluid in the thermoplastic polymer material may be determined by a fluid absorption method on Dumbell specimens as described, for example, in WO 04/066317.

By using the dielectric fluid in an amount as defined above, thermomechanical properties of the insulating layer are maintained and exudation of the dielectric fluid from the thermoplastic polymer material is avoided.

The at least one dielectric fluid is generally compatible with the thermoplastic polymer material. "Compatible" means that the chemical composition of the fluid and of the thermoplastic polymer material is such as to result into a microscopically homogeneous dispersion of the dielectric fluid into the polymer material upon mixing the fluid into the polymer, similarly to a plasticizer.

Generally, the weight ratio between the at least one dielectric fluid (c) and the thermoplastic polymer material (a) may be from 1:99 to 25:75, preferably from 2:98 to 15:85.

It has to be noticed also that the use of a dielectric fluid with a relatively low melting point or low pour point (e.g. a melting point or a pour point not higher than 80° C.) allows an easy handling of the dielectric fluid which may be melted with no need of additional and complex manufacturing steps (e.g. a melting step of the dielectric fluid) and/or apparatuses for admixing the liquid with the polymer material.

According to a further preferred embodiment, the dielectric fluid has a melting point or a pour point of from −130° C. to +80° C.

The melting point may be determined by known techniques such as, for example, by Differential Scanning calorimetry (DSC) analysis.

According to a further preferred embodiment, the dielectric fluid has a predetermined viscosity in order to prevent fast diffusion of the liquid within the insulating layer and hence its outward migration, as well as to enable the dielectric fluid to be easily fed and mixed into the thermoplastic polymer material. Generally, the dielectric fluid of the invention has a viscosity, at 40° C., of from 10 cSt to 800 cSt, preferably of from 20 cSt to 500 cSt (measured according to ASTM standard D445-03).

For example, the dielectric fluid is selected from mineral oils, for example, naphthenic oils, aromatic oils, paraffinic oils, polyaromatic oils, said mineral oils optionally containing at least one heteroatom selected from oxygen, nitrogen or sulfur; liquid paraffins; vegetable oils, for example, soybean oil, linseed oil, castor oil; oligomeric aromatic polyolefins; paraffinic waxes, for example, polyethylene waxes, polypropylene waxes; synthetic oils, for example, silicone oils, alkyl benzenes (for example, dodecylbenzene, di(octylbenzyl)toluene), aliphatic esters (for example, tetraesters of pentaerythritol, esters of sebacic acid, phthalic esters), olefin oligomers (for example, optionally hydrogenated polybutenes or polyisobutenes); or mixtures thereof. Paraffinic oils and naphthenic oils are particularly preferred.

Mineral oils as dielectric fluid can comprise polar compound/s. The amount of polar compound/s advantageously is up to 2.3 wt %. Such a low amount of polar compounds allows obtaining low dielectric losses.

The amount of polar compounds of the dielectric fluid may be determined according to ASTM standard D2007-02.

Alternatively, the dielectric fluid can comprise at least one alkylaryl hydrocarbon having the structural formula:

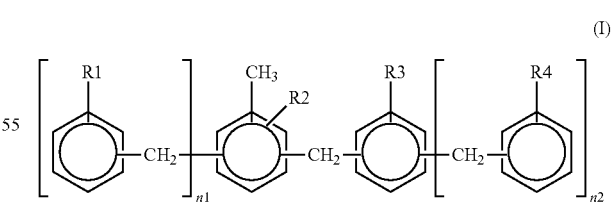

wherein:
R1, R2, R3 and R4, equal or different, are hydrogen or methyl;
n1 and n2, equal or different, are zero, 1 or 2, with the proviso that the sum n1+n2 is less than or equal to 3.

In another alternative, the dielectric fluid comprises at least one diphenyl ether having the following structural formula:

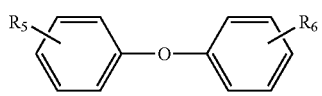

wherein $R_5$ and $R_6$ are equal or different and represent hydrogen, a phenyl group non-substituted or substituted by at least one alkyl group, or an alkyl group non-substituted or substituted by at least one phenyl. By alkyl group it is meant a linear or branched $C_1$-$C_{24}$, preferably $C_1$-$C_{20}$, hydrocarbon radical.

Suitable dielectric fluids for use in the covering layer for the cable of the invention is described, e.g., in WO 02/027731, WO 02/003398 or WO 04/066317, all in the Applicant's name.

The at least one nano-sized filler to be used according to the present invention generally has an average particle size (at least in one dimension) equal to or lower than 2000 nm, preferably from 1 to 500 nm.

As to the chemical nature of the nano-sized filler, it can be selected from a broad range of metal oxides, titanates, silicates, for example exfoliated montmorillonite, silica, alumina.

The nano-filler may be selected for example from: $ZnO$, $MgO$, $TiO_2$, $SiO_2$, $Al_2O_3$, $BaTiO_3$, $SnO$, $MnO_2$, $BiO_3$, $CuO$, $In_2O_3$, $La_2O_3$, $NiO$, $Sb_2O_3$, $SnO_2$, $SrTiO_3$, $Y_2O_3$, $W_2O_3$.

Preferably, the at least one nano-filler (b) is present in an amount of from 0.2 wt % to 5 wt %, more preferably from 0.5 wt % to 2 wt %, with respect to the weight of the thermoplastic polymer material (a).

Other components may be added in minor amounts to the thermoplastic polymer material according to the present invention, such as antioxidants, processing aids, water tree retardants, or mixtures thereof.

Conventional antioxidants suitable for the purpose are, for example, distearyl- or dilauryl-thiopropionate and pentaerythrityl-tetrakis [3-(3,5-di-t-butyl-4-hydroxyphen-yl)-propionate], or mixtures thereof.

Processing aids which may be added to the polymer composition include, for example, calcium stearate, zinc stearate, stearic acid, or mixtures thereof.

According to a preferred embodiment, the cable according to the present invention includes also at least one semiconductive layer which comprises, besides components (a) and (b), and optionally (c), as defined above, (d) at least one conductive filler, preferably a carbon black filler. The at least one conductive filler is generally dispersed within the thermoplastic polymer material in a quantity such as to provide the material with semiconductive properties, namely to obtain a volumetric resistivity value, at room temperature, of less than 500 am, preferably less than 20 am. Typically, the amount of carbon black can range between 1 and 50% by weight, preferably between 3 and 30% by weight, relative to the weight of the polymer.

The use of the same base polymer composition for both the insulating layer and the semiconductive layers is particularly advantageous in producing cables for medium or high voltage, since it ensures excellent adhesion between adjacent layers and hence a good electrical behaviour, particularly at the interface between the insulating layer and the inner semiconductive layer, where the electrical field and hence the risk of partial discharges are higher.

The polymeric compositions for the cable according to the present invention may be produced by mixing together the thermoplastic polymer material, the nano-sized filler and possibly the dielectric fluid and any other optional additive, by using methods known in the art. Mixing may be carried out for example by an internal mixer of the type with tangential rotors (Banbury) or with interpenetrating rotors; in a continuous mixer of Ko-Kneader (Buss) type, of co- or counter-rotating double-screw type; or in a single screw extruder.

According to a preferred embodiment, the dielectric fluid may be added to the thermoplastic polymer material during the extrusion step by direct injection into the extruder cylinder as disclosed, for example, in International Patent Application WO 02/47092 in the name of the Applicant.

Although the present description is mainly focused on cables for transporting or distributing medium or high voltage energy, the polymer composition of the invention may be used for coating electrical devices in general and in particular cable of different type, for example low voltage cables (i.e. cables carrying a voltage lower than 1 kV), telecommunications cables or combined energy/telecommunications cables, or accessories used in electrical lines, such as terminals, joints, connectors and the like.

BRIEF DESCRIPTION OF THE DRAWING

Further characteristics will be apparent from the detailed description given hereinafter with reference to the accompanying drawing, in which:

FIG. 1 is a perspective view of an energy cable, particularly suitable for medium or high voltage, according to the invention.

DETAILED DESCRIPTION OF THE PREFERRED EMBODIMENTS

In FIG. 1, the cable (1) comprises a conductor (2), an inner layer with semiconductive properties (3), an intermediate layer with insulating properties (4), an outer layer with semiconductive properties (5), a metal screen layer (6), and a sheath (7).

The conductor (2) generally consists of metal wires, preferably of copper or aluminium or alloys thereof, stranded together by conventional methods, or of a solid aluminium or copper rod.

The insulating layer (4) may be produced by extrusion, around the conductor (2), of a composition according to the present invention.

The semiconductive layers (3) and (5) are also made by extruding polymeric materials usually based on polyolefins, preferably a composition according to the present invention. The composition is made to be semiconductive by adding at least one conductive filler, usually carbon black.

Around the outer semiconductive layer (5), a metal screen layer (6) is usually positioned, made of electrically conducting wires or strips helically wound around the cable core or of an electrically conducting tape longitudinally wrapped and overlapped (preferably glued) onto the underlying layer. The electrically conducting material of said wires, strips or tape is usually copper or aluminium or alloys thereof.

The screen layer (6) may be covered by a sheath (7), generally made from a polyolefin, usually polyethylene.

The cable can be also provided with a protective structure (not shown in FIG. 1) the main purpose of which is to mechanically protect the cable against impacts or compressions. This protective structure may be, for example, a metal reinforcement or a layer of expanded polymer as described in WO 98/52197 in the name of the Applicant.

The cable according to the present invention may be manufactured in accordance with known methods, for example by extrusion of the various layers around the central conductor. The extrusion of two or more layers is advantageously carried out in a single pass, for example by the tandem method in which individual extruders are arranged in series, or by co-extrusion with a multiple extrusion head. The screen layer is then applied around the so produced cable core. Finally, the sheath according to the present invention is applied, usually by a further extrusion step.

The cable of the present invention can be use for either alternating current (AC) or direct current (DC) power transmission.

FIG. 1 shows only one embodiment of a cable according to the invention. Suitable modifications can be made to this embodiment according to specific technical needs and application requirements without departing from the scope of the invention. The following examples illustrate the invention, but without limiting it.

EXAMPLES 1-3

The following compositions were prepared with the amounts reported in Table 1 (expressed as % by weight with respect to the total weight of the composition).

In all of the examples, the propylene copolymer was fed directly into the extruder hopper. Subsequently, the dielectric fluid, previously mixed with antioxidants, was injected at high pressure into the extruder. An extruder having a diameter of 80 mm and a L/D ratio of 25 was used. The injection was made during the extrusion at about 20 D from the beginning of the extruder screw by means of three injection points on the same cross-section at 120° from each other. The dielectric fluid was injected at a temperature of 70° C. and a pressure of 250 bar. The nano-filler was fed into the polymeric mixture by a side dosimeter and dispersed by a twin-screw extruder (alternatively a Buss-bas can be used) with a thermal profile for the polymeric mixture of from 140° C. to 200° C.

TABLE 1

| | EXAMPLE | | |
|---|---|---|---|
| | 1 (*) | 2 | 3 |
| Adflex ™ Q200F | 93.7 | 91.2 | 92.7 |
| Jarylec ™ Exp3 | 6 | 6 | 6 |
| Nyasil ™ 5 | — | 2.5 | 1 |
| Irgastab ™ KV10 | 0.3 | 0.3 | 0.3 |

(*) comparative
Adflex ™ Q200F: propylene heterophase copolymer having melting point 165° C., melting enthalpy 30 J/g, and flexural modulus 150 MPa (Basell);
Jarylec ™ Exp3: dibenzyltoluene (DBT) (Elf Atochem);
Nyasil ™ 5: nano-sized amorphous silica with an average particle size of 1.8 μm (Nyacol Inc.).
Irgastab ™ KV10: 4,6-bis (octylthiomethyl)-o-cresol antioxidant (Ciba Speciality Chemicals, Inc.).

The dielectric breakdown strength (DS) of the polymer compositions obtained was evaluated on test-pieces of insulating material having the geometry proposed by the EFI (Norwegian Electric Power Research Institute) in the publication "The EFI Test method for Accelerated Growth of Water Trees" (IEEE International Symposium on Electrical Insulation, Toronto, Canada, Jun. 3-6, 1990). In this method, the cable is simulated with glass-shaped test-pieces of insulating material having their base coated on both sides with a semiconductive material coating. The glass-shaped test pieces were formed by moulding discs of insulating material at 160-170° C. from a plate 10 mm thick obtained by compressing each blend of Example 1 to 3 at about 190° C.

The inner and outer surfaces of the base, which had a thickness of about 0.40-0.45 mm, were coated with a semiconductive coating. The DS measurement was made by applying to these specimens, immersed in silicone oil at 20° C., an alternating current at 50 Hz starting with a voltage of 25 kV and increasing in steps of 5 kV every 30 minutes until perforation of the test-piece occurred. Each measurement was repeated on 10 test-pieces. The values given in Table 2 are the arithmetic mean of the individual measured values. Two series of experiments were carried out: the first one by discarding the samples having a DS lower than 25 kV/mm, the second one by discarding the samples having a DS lower than 75 kV/mm. The above screening of the specimens is necessary to exclude those which are defective because of the moulding process.

In the last row of Table 2, the percentage of specimens having a DS higher than 100 kV/mm is reported. An increase in DS is observed for the specimens according to the present invention.

TABLE 2

| | EXAMPLE | | |
|---|---|---|---|
| | 1 (*) | 2 | 3 |
| DS > 25 kV/mm | 98 | 109 | 94 |
| DS > 75 kV/mm | 98 | 109 | 117 |
| Specimens with DS > 100 kV/mm (%) | 33 | 83 | 33 |

(*) comparative

EXAMPLES 4-5

The following compositions were prepared with the amounts reported in Table 3 (expressed as % by weight with respect to the total weight of the composition), following the same conditions reported for Examples 1-3.

TABLE 3

| | EXAMPLE | |
|---|---|---|
| | 4 (*) | 5 |
| Hifax ™ CA 7441 A | 97 | 95 |
| Jarylec ™ Exp3 | 2.8 | 2.8 |
| MgO | — | 2 |
| Irganox ™ B225 | 0.2 | 0.2 |

(*) comparative
Hifax ™ CA 7441 A: propylene heterophase copolymer having melting point 165° C., melting enthalpy 30 J/g, and flexural modulus 150 MPa (Basell);
Jarylec ™ Exp3: dibenzyltoluene (DBT) (Elf Atochem);
MgO: magnesium oxide with an average particle size of 35 nm (Cometex S.r.l.)
Irganox ™ B225: phenolic/phosphate antioxidant (Ciba Speciality Chemicals, Inc.).

From the above compositions, specimens were obtained in the form of plates 1 mm-thick. The plates were moulded at 195° C. with 15 min preheating. The so obtained specimens were tested to determine tensile properties according to standard CEI EN 60811-1 (2006 June), with a tension speed of 50 mm/min. The results are reported in Table 4:

TABLE 4

| | EXAMPLE | |
| --- | --- | --- |
| | 4 (*) | 5 |
| Tensile strength (MPa) | 17.4 | 18.0 |
| Elongation at break (%) | 778.0 | 788.6 |
| Modulus at 100% (MPa) | 4.6 | 5.4 |
| Modulus at 200% (MPa) | 5.9 | 6.3 |
| Modulus at 300% (MPa) | 7.1 | 7.4 |

(*) comparative

The mechanical strength of the sample with the composition according to the invention showed to be improved in spite of the absence of a compatibilizer for the nano-filler.

The above compositions were also used for Pulse Electro Acoustic (PEA) measurements to evaluate space charge build-up in insulating materials.

For each composition, discs were prepared having a 0.3 mm thickness and a 50 mm diameter, placed between semicon electrodes having a 0.1 mm thickness and a 30 mm diameter. A DC voltage of 30 kV/mm was applied for 10,000 sec, and space charge was measured by PEA without voltage applied. The sample was electrically grounded without applied voltage for 2,000 sec, and then a DC voltage of −30 kV/mm was applied for 10,000 sec. The space charge without applied voltage was measured again by the PEA. The sample was electrically grounded without applied voltage for 1,000 sec, then the percentage of residual charge was measured. All measurements were made at room temperature. The results are reported in Table 5.

TABLE 5

| | EXAMPLE | |
| --- | --- | --- |
| | 4 (*) | 5 |
| $Q(+)$ $(C/m^3)$ | 0.50 | 0.25 |
| $Q(-)$ $(C/m^3)$ | 0.45 | 0.35 |
| Q res. @ 1,000 sec. (%) | 40 | 25 |

(*) comparative

The above results show a space charge content at Volt Off ($Q(+)$ or $Q(-)$ depending on the charge type) remarkably lower for the insulating compositions according to the present invention (Ex. 5), with respect to corresponding compositions devoid of any nanofiller (Ex. 4). Moreover, the discharge rate of the accumulated charge after Volt Off is much lower for the composition of Example 5 than for the composition of Example 4, as shown by the values of Q res. @ 1,000 sec (the lower the amount of residual charge after 1,000 sec from Volt Off, the higher the discharge rate of the accumulated charge).

EXAMPLES 6-8

The following compositions were prepared with the amounts reported in Table 6 (expressed as % by weight with respect to the total weight of the composition), following the same conditions reported for Examples 1-3.

TABLE 6

| | EXAMPLE | | |
| --- | --- | --- | --- |
| | 6 (*) | 7 (*) | 8 |
| Hifax ™ CA 7441A | 99.7 | 97.7 | 94.7 |
| Jarylec ™ Exp3 | — | — | 3 |
| ZnO | — | 2 | 2 |
| Irgastab ™ KV10 | 0.3 | 0.3 | 0.3 |

(*) comparative
Hifax ™ CA 7441A: ropylene heterophase copolymer having melting point 165° C., melting enthalpy 30 J/g, and flexural modulus 150 MPa (Basell);
Jarylec ™ Exp3: dibenzyltoluene (DBT) (Elf Atochem);
ZnO: nano powder with an average particle size lower than 100 nm (Sigma Aldrich)
Irgastab ™ KV10: 4,6-bis (octylthiomethyl)-o-cresol antioxidant (Ciba Speciality Chemicals, Inc.).

From the above compositions, specimens were obtained in the form of plates 1 mm-thick. The plates were moulded at 195° C. with 15 min preheating. The so obtained specimens were tested to determine tensile properties according to standard CEI EN 60811-1 (2006 June), with a tension speed of 50 mm/min. The results are reported in Table 7:

TABLE 7

| | EXAMPLE | | |
| --- | --- | --- | --- |
| | 6 (*) | 7 (*) | 8 |
| Tensile strength (MPa) | 18.2 | 21.5 | 17.2 |
| Elongation at break (%) | 781.9 | 816.4 | 791.1 |
| Modulus at 100% (MPa) | 4.8 | 5.9 | 4.9 |
| Modulus at 200% (MPa) | 6.0 | 6.8 | 5.9 |
| Modulus at 300% (MPa) | 7.2 | 7.9 | 7.1 |

(*) comparative

The mechanical strength of the sample with the composition according to the invention showed to be unaffected if not improved in spite of the absence of a compatibilizer for the nano-filler.

The addition of a nano-filler in the absence of an adjuvant for compatibilization between the nano-filler and a polypropylene material provides an insulating layer for power cable with improved electrical performance while maintaining, or even improving the mechanical resistance.

The invention claimed is:

1. A cable comprising at least one electrical conductor and at least one electrically insulating layer surrounding said electrical conductor, wherein the at least one electrically insulating layer is substantially devoid of any compatibilizer and comprises:
    (a) a thermoplastic polymer material selected from:
        at least one copolymer (i) of propylene with at least one olefin comonomer selected from ethylene and an α-olefin other than propylene, said copolymer having a melting point greater than or equal to 130° C. and a melting enthalpy of 20 J/g to 90 J/g;
        a blend of at least one copolymer (i) with at least one copolymer (ii) of ethylene with at least one α-olefin, said copolymer (ii) having a melting enthalpy of 0 J/g to 70 J/g; and
        a blend of at least one propylene homopolymer with at least one copolymer (i) or copolymer (ii); and
    (b) at least one nano-sized filler, in an amount of 0.2 wt % to 5 wt %, with respect to the weight of the thermoplastic polymer material (a);
    (c) at least one dielectric fluid, intimately admixed with the thermoplastic polymer material (a);
    wherein at least one of copolymer (i) and copolymer (ii) is a heterophasic copolymer.

2. The cable according to claim 1, wherein the at least one nano-sized filler (b) is untreated.

3. The cable according to claim 1, wherein the copolymer is a propylene/ethylene copolymer.

4. The cable according to claim 1, wherein the olefin comonomer in copolymer (i) is present in an amount equal to or lower than 15 mol %.

5. The cable according to claim 1, wherein the olefin comonomer in copolymer (i) is present in an amount equal to or lower than 10 mol %.

6. The cable according to claim 1, wherein copolymer (i) or copolymer (ii) is a random copolymer.

7. The cable according to claim 1, wherein, in the copolymer (i) or copolymer (ii) or both, when heterophasic, an elastomeric phase is present in an amount equal to or greater than 45 wt % with respect to the total weight of the copolymer.

8. The cable according to claim 7, wherein the elastomeric phase comprises an elastomeric copolymer of ethylene and propylene comprising 15 wt % to 50 wt % of ethylene and 50 wt % to 85 wt % of propylene with respect to the weight of the elastomeric phase.

9. The cable according to claim 1, wherein the olefin comonomer in copolymer (ii) is propylene, 1-hexene or 1-octene.

10. The cable according to claim 1, wherein copolymer (i), copolymer (ii) or both have a melting point of 140° C. to 180° C.

11. The cable according to claim 1, wherein copolymer (i) has a melting enthalpy of 25 J/g to 80 J/g.

12. The cable according to claim 1, wherein copolymer (ii) has a melting enthalpy of 10 J/g to 30 J/g.

13. The cable according to claim 1, wherein, when the thermoplastic material of the insulating layer comprises a blend of copolymer (i) and copolymer), the copolymer (ii) has a melting enthalpy lower than the melting enthalpy of the copolymer (i).

14. The cable according to claim 1, wherein, when the thermoplastic material of the insulating layer comprises a blend of copolymer (i) and copolymer (ii), the ratio between copolymer (i) and copolymer (ii) is 1:9 to 8:2.

15. The cable according to claim 1, wherein, when the thermoplastic material of the insulating layer comprises a blend of propylene homopolymer and at least one of copolymer (i) and copolymer (ii), the ratio between the propylene homopolymer and copolymer (i) or copolymer (ii) or both is 0.5:9 to 5:5.

16. The cable according to claim 1, wherein the concentration by weight of said at least one dielectric fluid in said thermoplastic polymer material is lower than the saturation concentration of said dielectric fluid in said thermoplastic polymer material.

17. The cable according to claim 1, wherein the weight ratio between the at least one dielectric fluid (c) and the thermoplastic polymer material (a) is 1:99 to 25:75.

18. The cable according to claim 1, wherein the at least one dielectric fluid (c) has a melting point or a pour point of −130° C. to +80° C.

19. The cable according to claim 1, wherein the at least one dielectric fluid (c) is selected from mineral oils; mineral oils containing at least one heteroatom selected from oxygen, nitrogen or sulfur; liquid paraffins; vegetable oils; oligomeric aromatic polyolefins; paraffinic waxes; and synthetic oils.

20. The cable according to claim 1, wherein the at least one nano-sized filler (b) has an average particle size (at least in one dimension) equal to or lower than 2000 nm.

21. The cable according to claim 1, wherein the at least one nano-sized filler (b) has an average particle size (at least in one dimension) of 1 to 500 nm.

22. The cable according to claim 1, wherein the at least one nano-sized filler (b) is selected from metal oxides, titanates, and silicates.

23. The cable according to claim 22, wherein the at least one nano-sized filler (b) is selected from: $ZnO$, $MgO$, $TiO_2$, $SiO_2$, $Al_2O_3$, $BaTiO_3$, $SnO$, $MnO_2$, $BiO_3$, $CuO$, $In_2O_3$, $La_2O_3$, $NiO$, $Sb_2O_3$, $SnO_2$, $SrTiO_3$, $Y_2O_3$, and $W_2O_3$.

24. The cable according to claim 1, wherein the at least one nano-sized filler (b) is present in an amount of 0.5 wt % to 2 wt %, with respect to the weight of the thermoplastic polymer material (a).

25. The cable according to claim 1, comprising at least one semiconductive layer further comprising (d) at least one conductive filler.

26. The cable according to claim 25, wherein the at least one conductive filler (d) is a carbon black filler.

27. The cable according to claim 1, wherein the weight ratio between the at least one dielectric fluid (c) and the thermoplastic polymer material (a) is 2:98 to 15:85.

* * * * *